United States Patent [19]
Eguchi

[11] Patent Number: 5,115,213
[45] Date of Patent: May 19, 1992

[54] FREQUENCY EQUALIZER

[75] Inventor: Takeo Eguchi, Kanagawa, Japan

[73] Assignee: Sony Corporation, Tokyo, Japan

[21] Appl. No.: 545,611

[22] Filed: Jun. 29, 1990

[30] Foreign Application Priority Data

Jun. 30, 1989 [JP] Japan .................................. 1-168377

[51] Int. Cl.⁵ .............................................. H03G 5/16
[52] U.S. Cl. .................................. 333/18; 333/28 R; 330/304
[58] Field of Search ...................... 333/18, 28 R; 375/11–14; 330/304; 381/103

[56] References Cited

U.S. PATENT DOCUMENTS

| | | | |
|---|---|---|---|
| 2,895,111 | 7/1959 | Rothe | 333/28 R |
| 3,652,952 | 3/1972 | Chen | 333/18 X |
| 3,728,649 | 4/1973 | Waldhauer | 333/28 R X |
| 4,262,263 | 4/1981 | Takasaki | 330/304 |

FOREIGN PATENT DOCUMENTS

| | | | |
|---|---|---|---|
| 0134516 | 10/1980 | Japan | 381/103 |
| 0103715 | 6/1985 | Japan | 333/18 |

Primary Examiner—Eugene R. LaRoche
Assistant Examiner—Seung Ham
Attorney, Agent, or Firm—Alvin Sinderbrand; William S. Frommer

[57] ABSTRACT

A frequency equalizer is provided for suitably correcting a frequency characteristic of a signal transmitted through a signal transmitting system such as a coaxial cable and the like. The frequency equalizer has a plurality of serially connected fundamental circuits in each of which an input signal is processed by a series circuit of a multiplying circuit and an amplifier having its own frequency characteristic to generate a first signal, the input signal is separately processed by an amplifier having a flat frequency characteristic to generate a second signal and the first and second signals are added or subtracted to derive an output signal. Therefore, a desired frequency characteristic can be corrected with ease only by setting the frequency characteristics of the plurality of fundamental circuits to proper frequency characteristics. Also, the circuit arrangement is formed of a building block system and therefore can be fabricated as an integrated circuit (IC).

5 Claims, 7 Drawing Sheets

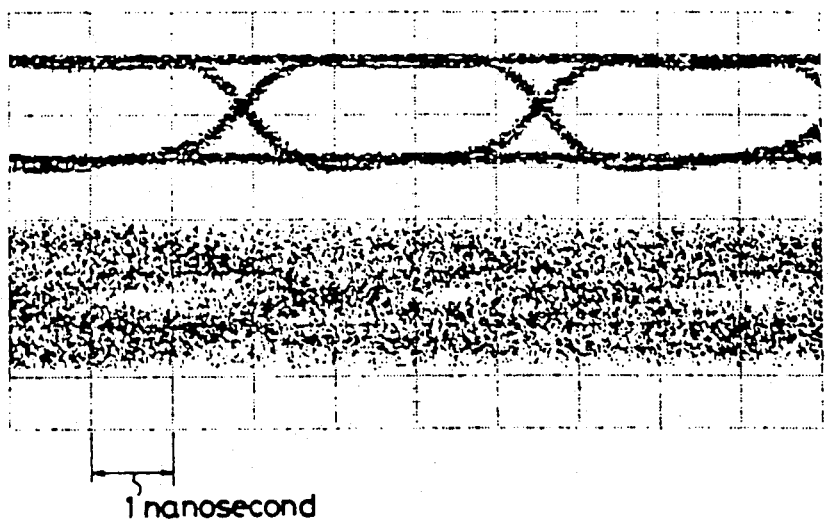
FIG. 9A
FIG. 9B
1 nanosecond
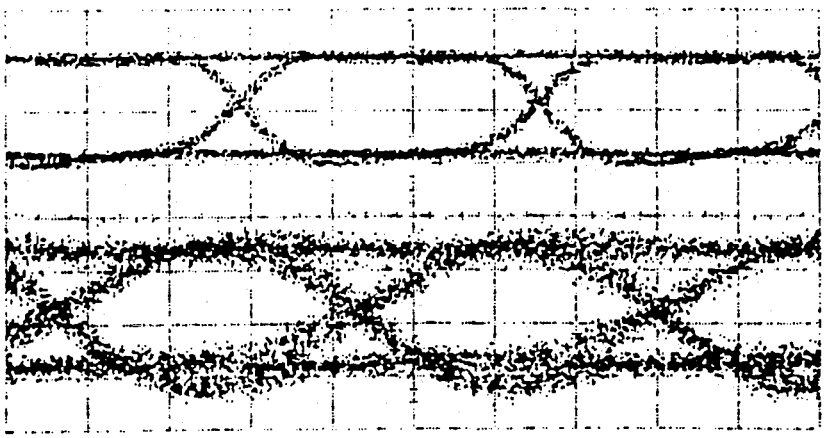
FIG. 10A
FIG. 10B

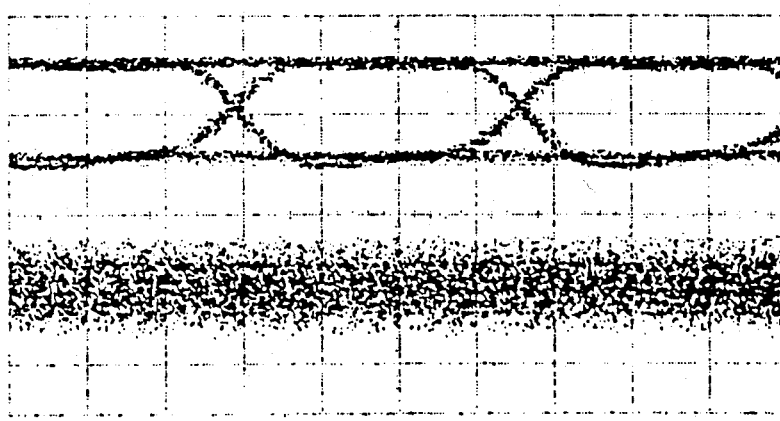
FIG. 11A
FIG. 11B
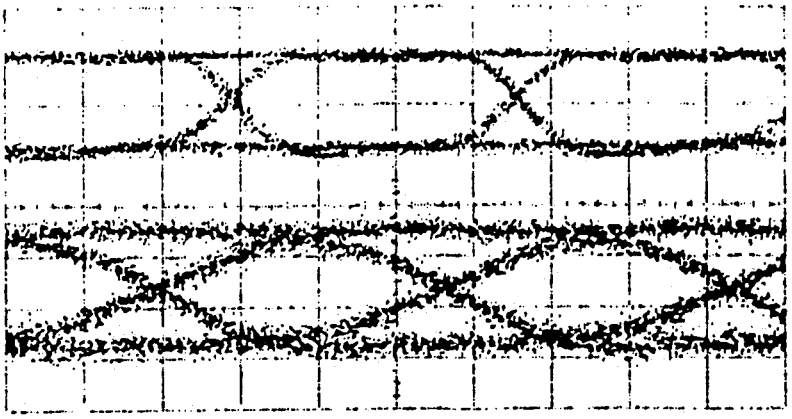
FIG. 12A
FIG. 12B

FREQUENCY EQUALIZER

BACKGROUND OF THE INVENTION

1. Field of the Invention

The present invention relates generally to frequency characteristic correcting apparatus, and more particularly is directed to a frequency equalizer in which circuits are formed in a so-called building block fashion.

2. Description of the Prior Art

When an electrical signal or an optical signal is transmitted through a signal transmission system such as a coaxial cable or a fiber optic cable the deterioration of the frequency characteristic in which the delay time and attenuation amount are changed due to the frequency of that signal occurs so that the waveform of the signal gradually changes from the waveform of the input signal. Accordingly, when a signal is transmitted by employing such signal transmission system, a waveform equalizing circuit (frequency characteristic correcting circuit) is utilized to correct the deterioration of the frequency characteristic so that the waveform of the original input signal is recovered.

Roughly classified, there are known two types of waveform equalizing circuits:

(1) Circuit employing a varicap diode

This circuit is to approximately compensate the deterioration of the frequency characteristic due to a coaxial cable or the like, by connecting in series emitter peaking circuits, each formed of a varicap diode.

(2) Circuit employing a high speed switching element

This circuit is to approximately achieve a desired frequency characteristic by the combination of amplifiers having different frequency characteristics by high speed switching elements such as PIN diodes and the like.

Of the prior-art waveform equalizing circuits, the circuit employing the varicap diode can not obtain a desired characteristic due to the fluctuation of the characteristic of the varicap diode without difficulty and also the number of items to be adjusted within the circuit is increased. Further, the varicap diode is not incorporated but is connected from the outside so that the whole of the circuit arrangement can not be fabricated as an integrated circuit (IC).

Using a waveform equalizing circuit employing the high speed switching element generally, a range in which the frequency characteristic can be varied is small, and approximate error can not be kept uniform over the whole variable range without difficulty. Furthermore, the element having a special switching characteristic can not be formed in the integrated circuit without difficulty, and this circuit can not be suitably fabricated as an integrated circuit.

OBJECTS AND SUMMARY OF THE INVENTION

Accordingly, it is an object of the present invention to provide an improved frequency equalizer which can eliminate the shortcomings and disadvantages encountered with the prior art.

More specifically, it is an object of the present invention to provide a frequency equalizer which can perform a desired frequency characteristic correction with ease.

It is another object of the present invention to provide a frequency equalizer which is suitable for being fabricated as an integrated circuit.

According to an aspect of the present invention, a frequency equalizer for correcting a frequency characteristic of an input signal is comprised of a first input circuit supplied with the input signal, a second input circuit supplied with a control signal, and a frequency characteristic correcting circuit formed of at least one signal processing circuit formed of a first signal transmitting circuit formed by serially connecting a multiplier having first and second input terminals and for multiplying input signals inputted thereto from the first and second input terminals and an amplifier having its own frequency characteristic, the first signal transmitting circuit for generating a first signal, a second signal transmitting circuit for transmitting the signals inputted to the first input terminal in a flat frequency characteristic and for generating a second signal and an adder for adding the first and second signals, wherein the input signal from the first input circuit is supplied to the first input terminal of the multiplier in the frequency characteristic correcting circuit and the control signal from the second input circuit is supplied to the second input terminal of the multiplier, whereby a signal transmission characteristic of the frequency characteristic correcting circuit is controlled by the control signal so that the adder derives a signal whose frequency characteristic is corrected.

These and other objects, features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

FIGS. 9A, 9B, FIGS. 10A, 10B, FIGS. 11A, 11B and FIGS. 12A, 12B are schematic representations used to explain an operation of the example shown in FIG. 7.

DETAILED DESCRIPTION OF THE PREFERRED EMBODIMENTS

A first embodiment of a frequency equalizer according to the present invention will hereinafter be described with reference to FIGS. 1 to 6.

Figure 1:
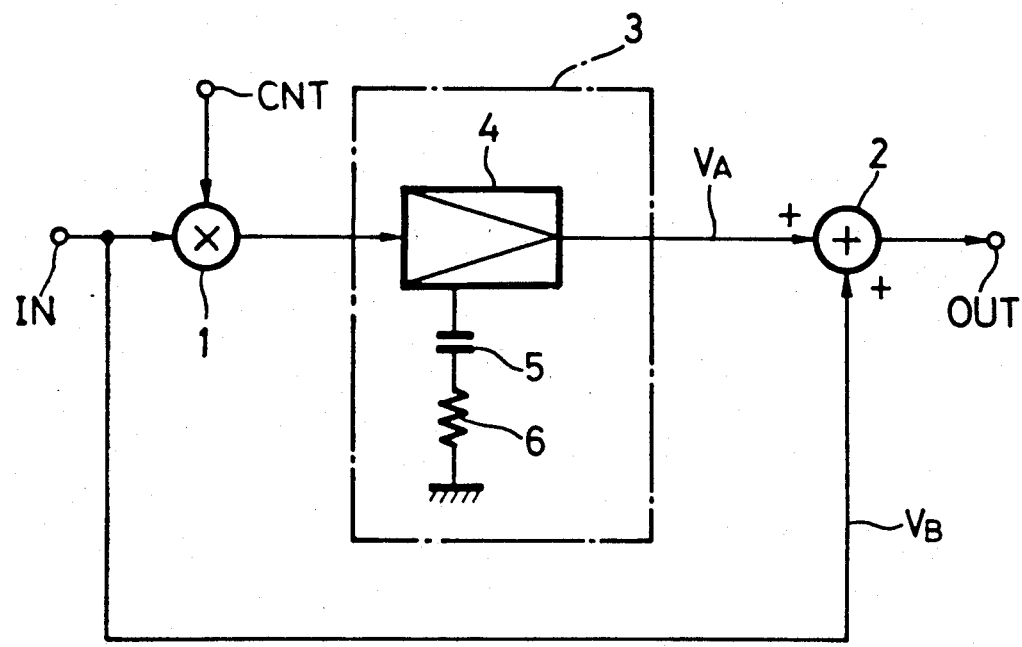
FIG. 1 is a schematic diagram showing a fundamental circuit of a first embodiment of a frequency equalizer according to the present invention.

FIG. 1 shows a fundamental circuit of this embodiment.

Referring to FIG. 1, an input signal $V_B$ applied to an input terminal IN is supplied to one input terminal of a multiplying circuit 1 and to one input terminal of an adding circuit 2. A control signal applied to a control terminal CNT is supplied to the other input terminal of the multiplying circuit 1. In FIG. 1, block 3 designates an amplifier wherein reference numeral 4 designates a linear amplifying circuit. The linear amplifying circuit 4 is grounded via a capacitator-resistor (CR) filter which is formed by connecting a capacitor 5 and a resistor 6 in series. In that case, by properly selecting the capacitance value of the capacitor 5 and the resistance value of the resistor 6 or the like to be pre-determined values, it is possible to give the amplifier 3 its own frequency characteristic.

An output signal of the multiplying circuit 1 is supplied to the amplifier 3, from which there is derived a first signal $V_A$. The first signal $V_A$ is supplied to the other input terminal of the adding circuit 2. Although the adding circuit 2 is shown to be directed supplied at one input terminal thereof with the input signal $V_B$ that input signal may be supplied to one input terminal of the adding circuit 2 via an amplifier having a flat frequency characteristic (not shown). This input signal $V_B$ supplied to one input terminal of the adding circuit 2 (the input signal itself in this embodiment) is referred to as a second signal. The first and second signals $V_A$ and $V_B$ are added by the adding circuit 2, and the added output from the adding circuit 2 is fed to an output terminal OUT.

Figure 2:
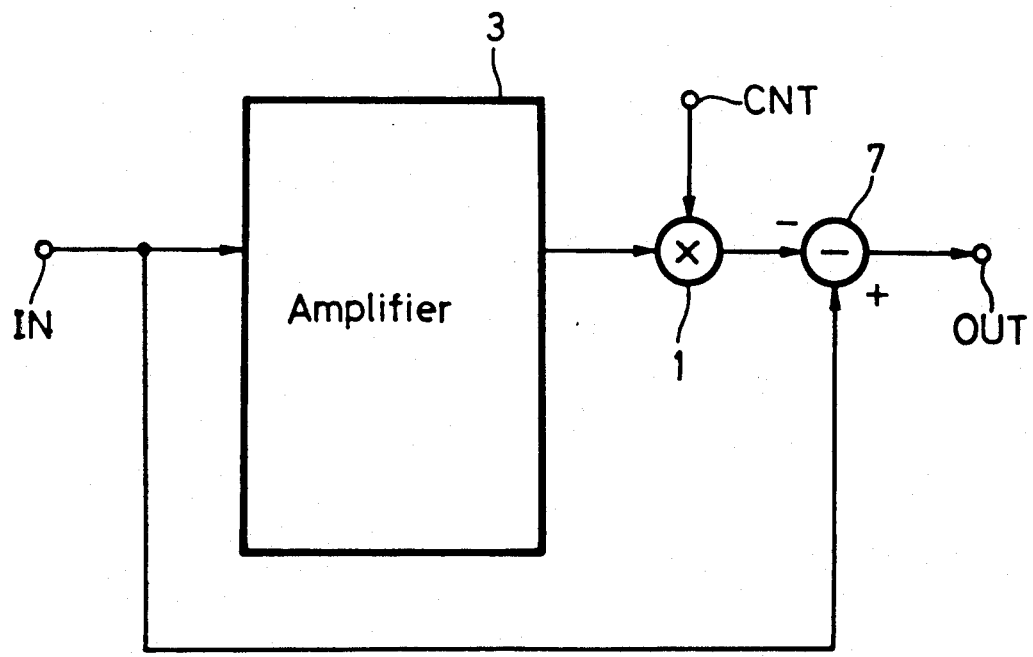
FIG. 2 is a schematic diagram showing a modified example of the fundamental circuit shown in FIG. 1.

Further, the fundamental circuit shown in the embodiment of FIG. 1 may be replaced with a fundamental circuit shown in FIG. 2. In FIG. 2, like parts corresponding to those of FIG. 1 are marked with the same reference numerals and therefore will not be described in detail.

Referring to FIG. 2, unlike the fundamental circuit shown in FIG. 1, the order of the multiplying circuit 1 and the amplifier 3 is exchanged and the adding circuit 2 is replaced with a subtracting circuit 7. In that case, the adding side input terminal and the subtracting side input terminal of the subtracting circuit 7 may be interchanged.

Since the amplifier 3 in the fundamental circuit shown in the example of FIG. 1 or 2 involves a CR filter, a transfer function A of the amplifier 3 can be expressed by a bilinear expression. More precisely, let $\omega$ represent an angular frequency and a, let b, c and d represent coefficients which can be positive or negative numbers. Then, the transfer function A can be expressed by the following equation:

$$A = \frac{aj\omega + c}{bj\omega + d} \quad (1)$$

Accordingly, the transfer function A includes one zero point $-c/a$ and one pole $-d/b$. Then, let K represent the signal transmission characteristic, that is the coefficient to be multiplied in the multiplying circuit 1 and let H represent the total transfer function of the fundamental circuit in this embodiment. Then the transfer function H can be expressed as follows:

$$H = 1 + K \frac{aj\omega + c}{bj\omega + d} \quad (2)$$

Figure 3:
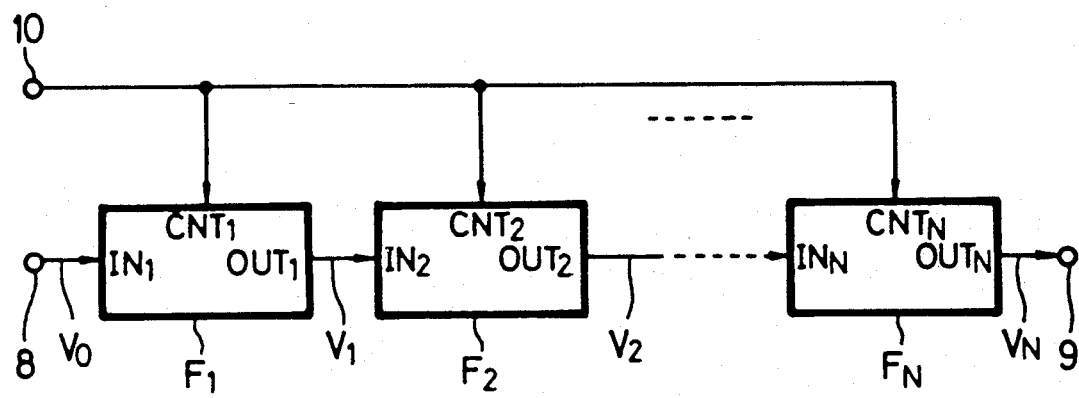
FIG. 3 is a schematic diagram showing a frequency equalizer formed by connecting the fundamental circuits shown in the example of FIG. 1 in series.

In this embodiment, N fundamental circuits shown in FIG. 1 are connected in cascade as shown in FIG. 3 where N is a positive integer larger than 2.

In FIG. 3, reference letters $F_1$ to $F_N$ designate fundamental circuits having different or identical frequency characteristics. As shown in FIG. 3, an output terminal $OUT_1$ of the fundamental circuit $F_1$ is connected to an input terminal $IN_2$ of the fundamental circuit $F_2$, and an output terminal $OUT_2$ of the fundamental circuit $F_2$ is connected to an input terminal of a fundamental circuit $F_3$ (not shown). The remaining fundamental circuits are connected in the same manner, though not shown.

In FIG. 3, reference numeral 8 represents an input terminal, reference numeral 9 represents an output terminal and reference numeral 10 represents a common control terminal. Referring to FIG. 3, the input terminal 8 is connected to the input terminal $IN_1$ of the fundamental circuit $F_1$, the output terminal $OUT_N$ of the fundamental circuit $F_N$ is connected to the output terminal 9 and the control terminal 10 is commonly connected to the control terminals $CNT_1$ to $CNT_N$ of the fundamental circuits $F_1$ to $F_N$.

When a signal $V_0$ is supplied through the input terminal 8 to the fundamental circuit $F_1$, it is; signal $V_0$ is supplied to and processed by the fundamental circuits $F_1$ to $F_N$ which produce output signals $V_1$ to $V_N$ respectively. The finally obtained signal $V_N$ is fed through the output terminal 9 to the succeeding processing circuit (not shown). Further, in this embodiment, a control signal corresponding to the coefficient K is supplied to the control terminal 10, whereby the multiplication of the coefficient K is commonly carried out in the multiplying circuits 1 of the fundamental circuits $F_1$ to $F_N$. Accordingly, if Hn represents the transfer function of the fundamental circuit Fn (n=1, . . . , N), then, in accordance with the equation (2), the transfer function Hn is expressed as follows:

$$H_n = 1 + K \frac{a_n j\omega + c_n}{b_n j\omega + d_n} \quad (3)$$
$$= 1 + K g_n(\omega)$$

In the equation (3), $g_n(\omega)$ represents, in principle, a function having one zero point and one pole, wherein $a_n = 0$ yields no zero point, $b_n = 0$ yields no pole and $a_n = b_n = 0$ yields neither zero point nor pole. Therefore, in the embodiment of FIG. 3, if $H_0$ represents a total transfer function, that is, a transfer function between the signals $V_0$ and $V_N$, then such total transfer function $H_0$ is expressed by using the transfer function Hn in the equation (3) as follows:

$$H_0 = H_1 \cdot H_2 \cdot \ldots \cdot H_N \cdot \quad (4)$$
$$= 1 + K f_1(\omega) + K^2 f_2(\omega) + \ldots + K^N f_N(\omega)$$

In the above-described equation (4), $f_j(\omega)$ (j=1, 2, . . . , N) represents a j-order function of $g_n(\omega)$ (n=1, 2, . . . , N), and $f_j(\omega)$ has almost j zero points and j poles.

An operation of the fundamental circuit shown in FIG. 3 will now be described.

The total transfer function $H_0$ is expressed by the equation (4) so that, when the value of the coefficient K is selected to be, for example, zero, the total transfer function can be determined be 1 (that is, corresponding to a completely flat frequency characteristic). Further, when the value of the coefficient K is selected to be 1, the total transfer function $H_0$ can be determined so as to fully involve $f_1(\omega)$ to $f_N(\omega)$ of the equation (4) in the perfect form. Therefore, according to this embodiment, the common coefficient K supplied to the fundamental circuits $F_1$ to $F_N$ can be selected from a wide variety of values ranging from a negative value to positive value, whereby the frequency characteristic in the overall circuit arrangement can easily be determined.

For example, let it be assumed that the fundamental circuit shown in FIG. 3 is applied to a waveform equalizing circuit which corrects the signal deterioration in the signal transmitting system of a magnetic recording and/or reproducing apparatus. Also, let it be assumed that a gain-frequency characteristic necessary for equalizing the signal waveform is represented by a continuous curve function 16 shown in FIG. 4, and which can be approximated by a function 17 shown in dotted lines on FIG. 4 to be comprised of straight line segments having respective inclinations of $\pm 6$ dB/oct, $\pm 12$ dB/oct, $\pm 18$ dB/oct, and so on. Then, the number N of the fundamental circuits $F_1$ to $F_N$ is determined and the zero points and poles of the fundamental circuits $F_1$ to $F_N$ are chosen so as to provide the function 17.

Further, the correcting circuit shown in FIG. 3 is formed as a so-called building block system merely by connecting the fundamental circuits $F_1$ to $F_N$ and does not employ special elements such as varicap diodes and high speed switching elements which are not suitable for being fabricated into an integrated circuit. Accordingly, the correcting circuit shown in FIG. 3 can be manufactured by forming a circuit having a pre-determined pattern in a step-and-repeat fashion. Thus, an advantage of the circuit of this embodiment is that it can be suitably fabricated as an integrated circuit.

As another example, the frequency characteristic correcting circuit of this embodiment can be applied to a so-called video special effects apparatus. For example, if only the fundamental circuits $F_1$ and $F_2$ of the embodiment shown in FIG. 3 are used and transfer functions $H_1$ and $H_2$ of the fundamental circuits $F_1$ and $F_2$ are expressed by the following equations:

$$H_1 = 1 - Kuj\omega, \quad H_2 = 1 - Kuj\omega \quad (5)$$

Then, the total transfer function H can be expressed as $$H = H_1 \cdot H_2 = 1 - (K\alpha)^2 \omega^2 \quad (6)$$

Figure 5:
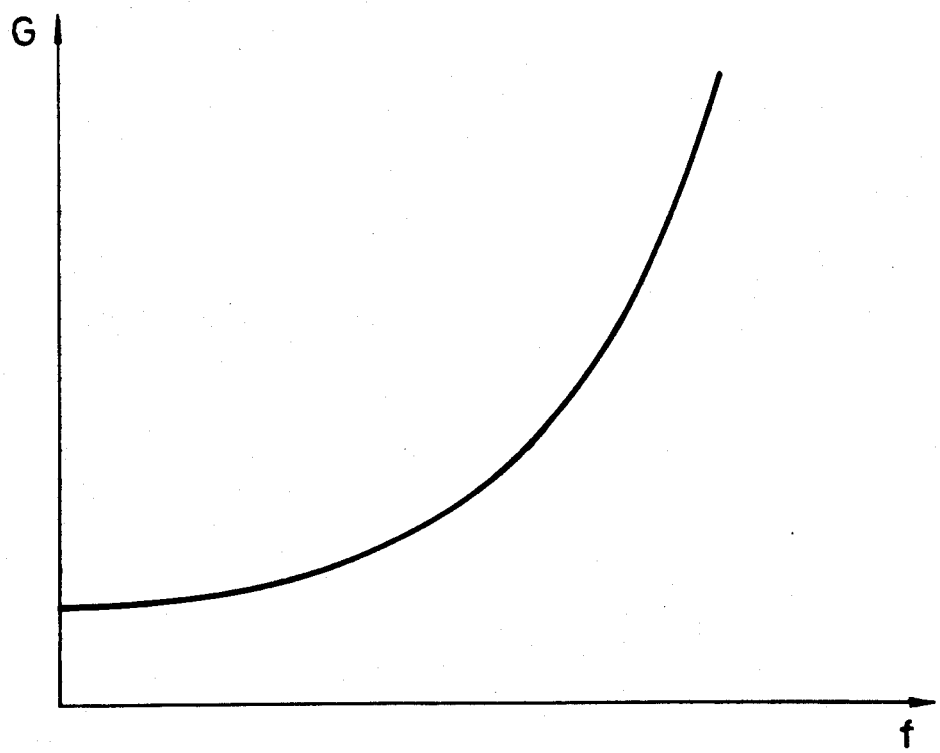

The resulting gain-frequency characteristic is shown in FIG. 5. The characteristic shown in FIG. 5 emphasizes a high frequency component so that, when a video signal is processed, a contour of a video image is emphasized.

Figure 6:
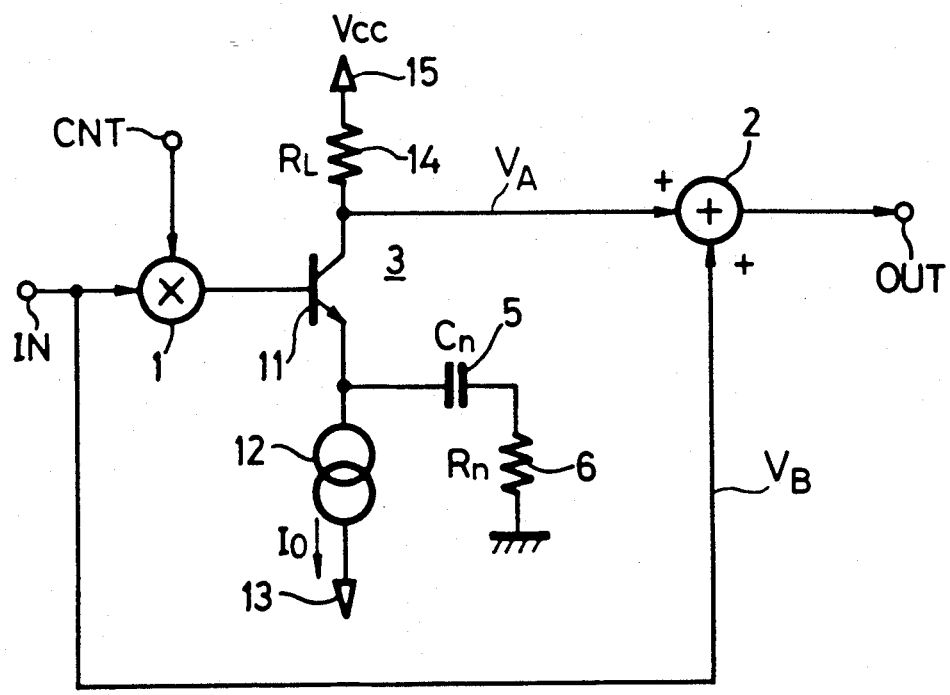
FIG. 6 is a circuit diagram showing a practical example of the fundamental circuit shown in the example of FIG. 1.
Figure 4:
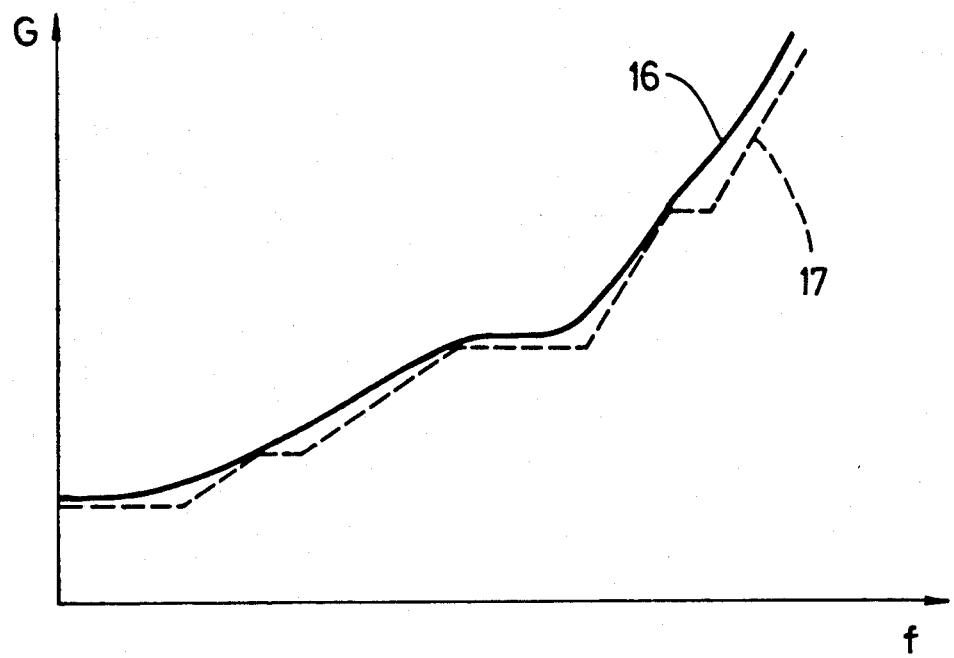
FIGS. 4 and 5 are graphs of a relationship between a frequency and a gain, and to which reference will be made in explaining an operation of the present invention.

FIG. 6 shows more in detail the fundamental circuit shown in FIG. 1 wherein like parts corresponding to those of FIG. 1 are marked with the same references and therefore will not be described in detail.

Referring to FIG. 6, the output signal of the multiplying circuit 1 is supplied to the base of an npn transistor 11, and the emitter of the npn transistor 11 is connected through a current source 12 of a current $I_0$ to a negative power source terminal 13. Simultaneously, the emitter of the npn transistor 11 is grounded via a capacitor 5 having a capacitance value Cn and a resistor 6 having a resistance value Rn. The collector of the npn transistor 11 is connected through a load resistor 14 having a resistance value $R_L$ to a positive power source terminal 15. A signal developed at the collector of the npn transistor 11 is the signal $V_A$ supplied to the respective input terminal of the adding circuit 2. Other arrangements are the same as those of the embodiment shown in FIG. 1.

In FIG. 6, assuming that the output impedance of the multiplying circuit 1 is sufficiently low so that the input impedance to the adding circuit 2 is sufficiently higher than the resistance value $R_L$ of the load resistor 14, and that the inside resistance of the current source 12 is infinite, then the transfer function An of the amplifier 3 can be expressed as follows:

$$An = \frac{R_L}{R_n - 1/(j\omega C_n)} = \frac{j\omega C_n R_L}{1 - j\omega C_n R_n} \quad (7)$$

$$= \frac{jZ_n}{1 - jP_n}$$

$$P_n = \omega C_n R_n, \quad Z_n = \omega C_n R_L \quad (8)$$

If $H_n$ represents the transfer function of the overall circuit arrangement of the fundamental circuit shown in FIG. 6, the transfer function $H_n$ can be determined from the following equation:

$$H_n = 1 - \frac{K \cdot jZ_n}{1 - jP_n} \quad (9)$$

where the value of the coefficient K falls in the range $0 \leq K \leq 1$. In the embodiment shown in FIG. 6, setting the capacitance value Cn and the resistance values $R_n$ and $R_L$ in appropriately, it is possible to obtain a desired frequency characteristic. In that case, the amplifier 3 shown in FIG. 6 corresponds with a half circuit of a differential amplifier, and in actual practice, a differential amplifier formed by the combination of two half circuits might be used.

A second embodiment of the present invention will now be described with reference to FIGS. 7 to 12. In this embodiment, the present invention is applied to a coaxial cable data transmission equalizing circuit for a coaxial cable through which a digital signal of approximately 270 Mbps for a digital video tape recorder (i.e., digital VTR) is transmitted. In this embodiment, there are two fundamental circuits, that is, N=2, and $0 \leq K \leq 1$, the fundamental circuits are arranged as shown in FIG. 3 and the overall circuit arrangement is fabricated as an integrated circuit.

Figure 7:
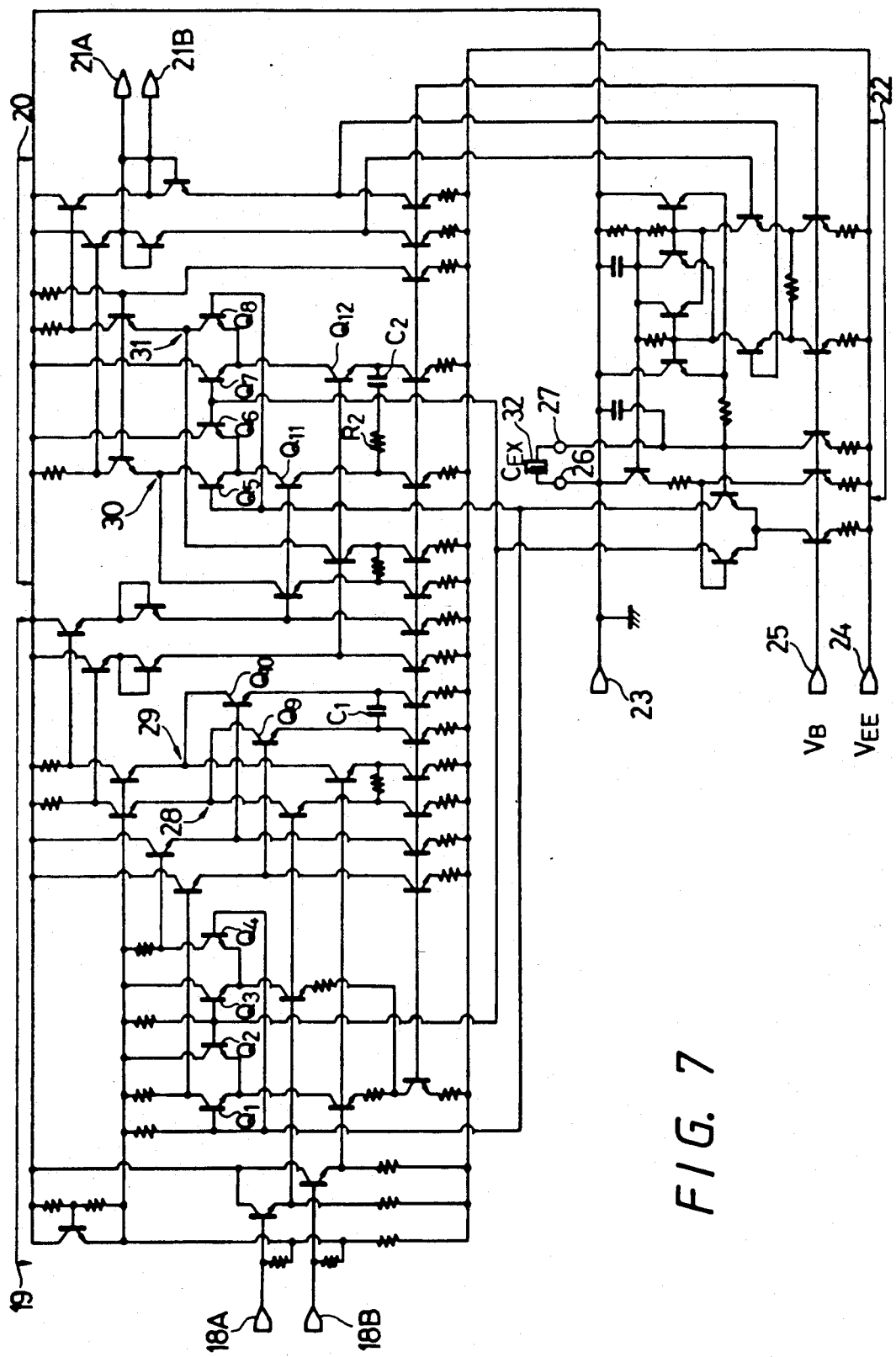
FIG. 7 is a circuit diagram of a second embodiment of the present invention in which the present invention is applied to an equalizing circuit used to transmit coaxial cable data.
Figure 8:
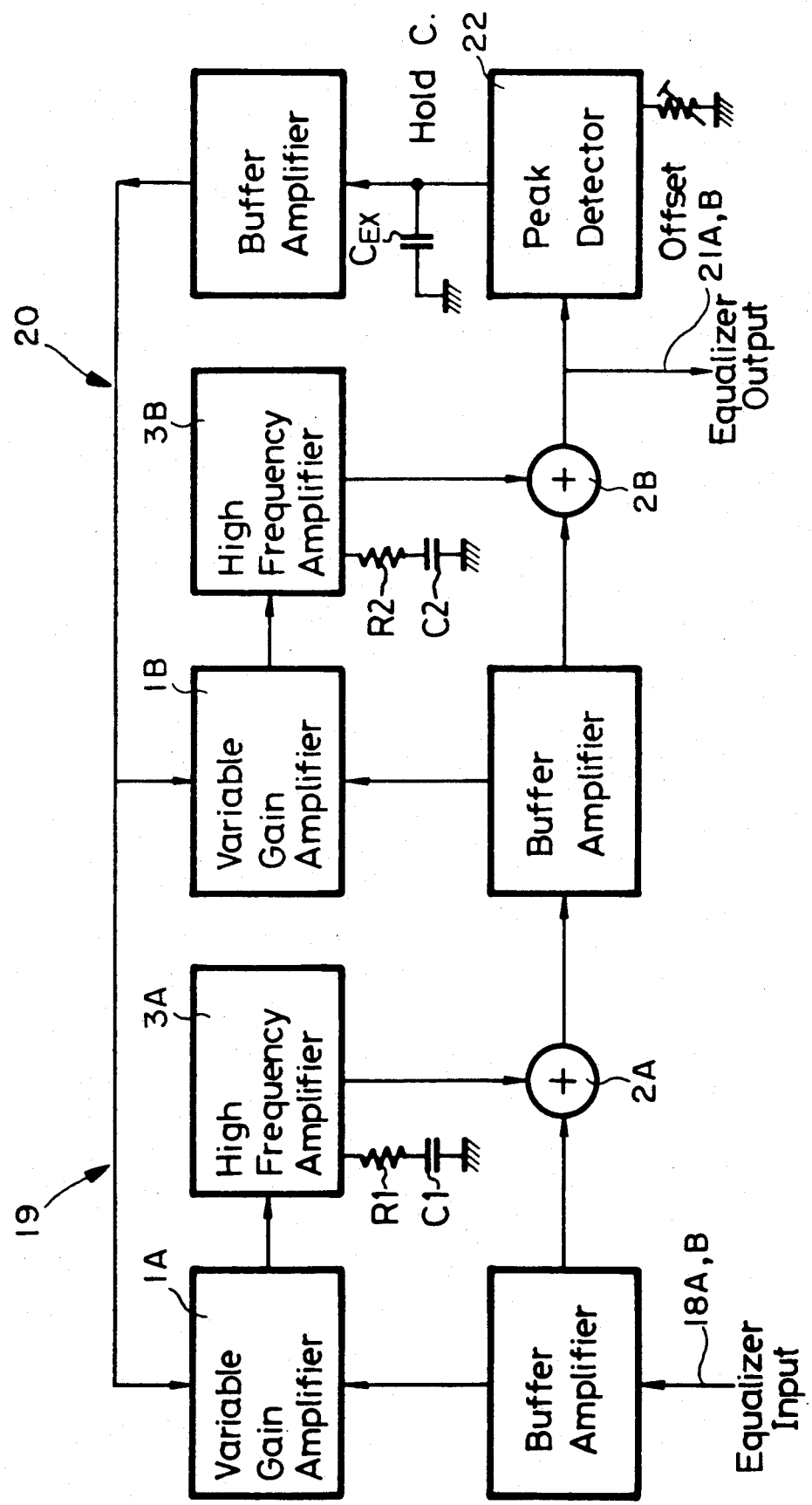
FIG. 8 is a block diagram of the second embodiment of the present invention.

FIG. 7 shows a waveform equalizing circuit according to this embodiment, and FIG. 8 shows a block diagram of the waveform equalizing circuit shown in FIG. 7.

In FIG. 7, reference numerals 18A and 18B designate input terminals through which differential input signals are supplied to a first stage equalizer 19 provided as the first fundamental circuit. Differential output signals of the first stage equalizer 19 are supplied to a second stage equalizer 20 provided as the second fundamental circuit. Differential output signals of the second stage equalizer 20 are supplied through a pair of output terminals 21A and 21B to a succeeding signal processing circuit (not shown). Further, signals whose levels change with the differential output signals from the second stage equalizer 20 are supplied to a peak value detecting circuit 22. The peak value detecting circuit 22 holds a signal corresponding to the maximum value of the amplitude of the equalized output signal, which is the output signal of the second stage equalizer 20, and negatively feeds the same back to the respective multiplying circuit sections of the first and second stage equalizers 19 and 20. In the peak value detecting circuit 22, reference numerals 26 and 27 designate connecting terminals and a capacitor 32 having a capacitance value $C_{EX}$ for holding a peak value is interposed between these connecting terminals 26 and 27.

Further, in FIG. 7, reference numeral 23 denotes a ground terminal, reference numeral 24 denotes a negative power source terminal to which there is supplied a negative power supply source voltage $V_{EE}$ (e.g., $-5V$), and reference numeral 25 denotes an input terminal to which there is supplied with a bias voltage $V_B$ that is used to set a pre-determined transistor bias current.

The operation of the equalizing circuit in the second embodiment shown in FIG. 7 will be described next.

As shown in FIG. 7, in the first stage equalizer 19, transistors $Q_1$, $Q_2$, $Q_3$ and $Q_4$ constitute a variable gain amplifier forming the multiplying circuit, 1A (FIG. 8) and transistors $Q_9$, $Q_{10}$ constitute an amplifier 3A. A frequency characteristic of this amplifier is given by a capacitor $C_1$ connected between the emitters of transistors $Q_9$ and $Q_{10}$. Signals are added at junctions 28 and 29 constituting an adder 2A between the multiplying circuit 1A and the amplifier 3A.

In the second stage equalizer 20, transistors $Q_5$, $Q_6$, $Q_7$ and $Q_8$ constitute a variable gain amplifier forming the multiplying circuit 1B (FIG. 8), and transistors $Q_{11}$ and $Q_{12}$ constitute the amplifier 3B. A frequency characteristic of this amplifier 3B is given by a capacitor $C_2$ and a resistor $R_2$ connected in series between emitters of transistors $Q_{11}$ and $Q_{12}$. Signals are added at junctions 30 and 31 between the circuits constituting the adder 2B on FIG. 8. In this embodiment, in order that the amplitude of the differential output signal is equalized to a constant value by the action of the peak value detecting circuit 22, the values of the coefficients K in the respective multiplying circuits or variable gain amplifiers 1A and 1B in the first and second equalizers 19 and 20 are commonly controlled, with the result that a stable output signal can always be obtained regardless of the fluctuation of the input signal. This also means that, according to the second embodiment of the invention, an automatic equalizing circuit can be realized.

In order to check the effect of the equalizing circuit in the second embodiment shown in FIG. 7, experiments were carried out, in which a data signal of 270 Mbps was transmitted through a coaxial cable of 100 meters in length. The experimental results are illustrated in FIGS. 9A, 9B, 10A and 10B.

FIG. 9A illustrates a waveform of an input signal to the coaxial cable, and FIG. 9B illustrates a waveform of an output signal derived from the coaxial cable wherein the equalizing circuit of this embodiment is not utilized. The ranges in the vertical direction of FIGS. 9A and 9B are different from each other. FIG. 10A substantially shows a waveform of an input signal to the coaxial cable, and FIG. 10B shows a waveform of an output signal from the coaxial cable wherein the equalizing circuit in this embodiment is utilized.

As is clear from the comparision of FIGS. 9B and 10B, use of the equalizing circuit of this embodiment permits the waveform of the input signal to be recovered substantially and accurately.

Similarly, the experiments were carried out, in which the digital signal was transmitted through a coaxial cable of 250 m in length, and the experimental results are illustrated in FIGS. 11A, 11B, 12A and 12B. The comparison of FIGS. 11B and 12B demonstrates that use of the equalizing circuit of this embodiment permits the waveform to be accurately equalized even when the length of the coaxial cable is 250 m.

As described above, for an analog or digital signal transmission system such as the coaxial cable in which the frequency characteristic monotonically deteriorates in proportion to the length thereof, such signal deterioration can be substantially corrected simply by adjusting the constants of the capacitor and the resistor in the equalizing circuit in this embodiment. Since only the constants of the capacitor and the resistor need to be adjusted, the equalizing circuit can be fabricated as an integrated circuit with great ease.

According to the present invention, the frequency characteristics of a plurality of fundamental circuits are easily adjusted to correct for frequency characteristic deterioration previously suffered by an input signal. Furthermore, since the frequency characteristic correcting circuit of the present invention is formed in building block fashion, it can be easily fabricated as an integrated circuit.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

I claim as my invention:

1. An apparatus for correcting a frequency characteristic of an input signal, comprising:
   first input means for receiving said input signal;
   second input means for receiving a control signal; and
   at least one signal processing means including a first signal transmitting circuit including multiplying means having a first input terminal for receiving said input signal from said first input means and a second input terminal for receiving said control signal from said second input means for multiplying said input signal and said control signal to produce a multiplied signal, amplifying means having a predetermined frequency characteristic and coupled with said multiplying means for amplifying said multiplied signal to thereby produce a first signal, a second signal transmitting circuit having a flat frequency characteristic, and coupled with said first input means to receive said input signal therefrom and thereby produce a second signal, and adding means for adding said first and second signals to thereby produce a corrected signal, whereby a signal transmission characteristic of the apparatus may be controlled by said control signal for correcting a frequency characteristic of said intput signal.

2. An apparatus according to claim 1, further comprising at least another of said signal processing means coupled to said one signal processing means in cascade such that said corrected signal of said adding means in said one signal processing means is input to said first input terminal of said multiplying means in said other signal processing means, and said control signal from said second input means is commonly supplied to said second input terminal of said multiplying means in each of said signal processing means.

3. An apparatus according to claim 1, further comprising peak detecting means receiving said corrected signal, for detecting a peak value of said corrected signal and providing a corresponding detector output signal and means for providing said detector output signal as said control signal to said second input means.

4. An apparatus for correcting a frequency characteristic of an input signal, comprising:

first input means for receiving said input signal;

second input means for receiving a control signal;

first transmission means having a variable signal transmission characteristic and being coupled with said first input means and said second input means so that said control signal controls the transmission characteristic of said first transmission means in transmitting said input signals, said first transmission means including multiplying means for multiplying said input signal and said control signal and providing a multiplied signal therefrom, and amplifying means to produce said transmitted input signal having a predetermined frequency characteristic and coupled to said multiplying means to receive said multiplied signal;

second transmission means having a flat frequency characteristic and coupled with said first input means for providing a base signal; and combining means in the form of an adder for combining the transmitted input signal and said base signal to produce a corrected signal.

5. An apparatus for correcting a frequency characteristic of an input signal, comprising:

first input means for receiving said input signal;

second input means for receiving a control signal;

first transmission means having a variable signal transmission characteristic and being coupled with said first input means and said second input means so that said control signal controls the transmission characteristic of said first transmission means in transmitting said input signals, said first transmission means including amplifying means acting on said input signal to produce an intermediate signal having a predetermined frequency characteristic and multiplying means for multiplying said control signal and said intermediate signal;

second transmission means having a flat frequency characteristic and coupled with said first input means for providing a base signal; and combining means for combining the transmitted input signal and said base signal to produce a corrected signal, said combining means including a subtractor for subtracting one of the output of said multiplying means and said base signal from the other.

* * * * *